United States Patent
Yumoto

(10) Patent No.: US 6,877,928 B2
(45) Date of Patent: Apr. 12, 2005

(54) CONSTRUCTION OF COUPLING SPLINE SECTIONS OF AUTOMATIC TRANSMISSION

(75) Inventor: Yasuaki Yumoto, Shizuoka (JP)

(73) Assignee: JATCO Ltd, Fuji (JP)

( * ) Notice: Subject to any disclaimer, the term of this patent is extended or adjusted under 35 U.S.C. 154(b) by 23 days.

(21) Appl. No.: 10/251,844

(22) Filed: Sep. 23, 2002

(65) Prior Publication Data

US 2003/0061892 A1 Apr. 3, 2003

(30) Foreign Application Priority Data

Sep. 28, 2001 (JP) .......................................... 2001-303914

(51) Int. Cl.⁷ .............................................. B25G 3/28
(52) U.S. Cl. ............................... 403/359.1; 403/359.6; 74/411; 74/413
(58) Field of Search ................ 74/411, 413; 29/892.11; 403/359.8, 359.6

(56) References Cited

U.S. PATENT DOCUMENTS

| | | | | |
|---|---|---|---|---|
| 3,894,621 A | * | 7/1975 | Quick .................... 192/109 R |
| 3,970,398 A | * | 7/1976 | Wilson ........................ 403/26 |
| 4,175,404 A | * | 11/1979 | Schopf ....................... 464/158 |
| 4,292,001 A | * | 9/1981 | Snell ........................ 403/359.5 |
| 4,343,563 A | * | 8/1982 | Bernhagen .................. 403/282 |
| 4,395,247 A | * | 7/1983 | Roberts ...................... 464/158 |
| 4,509,381 A | * | 4/1985 | Ikemoto et al. ................ 74/413 |
| 4,932,809 A | * | 6/1990 | Kopp ....................... 403/359.3 |
| 5,505,662 A | * | 4/1996 | Giberson ..................... 464/156 |
| 5,558,456 A | * | 9/1996 | Nakase et al. ........... 403/359.1 |
| 5,715,918 A | * | 2/1998 | Everett et al. ............ 192/48.92 |
| 5,829,135 A | * | 11/1998 | Koneda et al. .......... 29/892.11 |
| 6,327,934 B1 | * | 12/2001 | Barthel ........................ 74/607 |
| 6,467,565 B1 | * | 10/2002 | Handa et al. ................ 180/383 |
| 6,530,859 B2 | * | 3/2003 | Boston et al. ............... 475/331 |
| 6,553,868 B2 | * | 4/2003 | Takenaka et al. ......... 74/665 B |
| 6,648,106 B2 | * | 11/2003 | Hayabuchi et al. ........ 188/82.1 |

* cited by examiner

*Primary Examiner*—Daniel P. Stodola
*Assistant Examiner*—Carlos Lugo
(74) *Attorney, Agent, or Firm*—Foley & Lardner LLP

(57) ABSTRACT

A construction of coupling spline sections of an automatic transmission includes: a rotary shaft section having an outer periphery formed with a spline section; a rotary hollow section having an inner periphery formed with a spline section which is coupled with the spline section of the rotary shaft section in a press fitting state; a support member; and a bearing disposed between a part of an outer periphery of the rotary hollow section and the support member. The bearing rotatably bears the rotary shaft section in such a manner as to transmit a torque between the rotary shaft section and the rotary hollow section. The spline section of the rotary shaft section and the spline section of the rotary hollow section which are disposed at least inside the bearing are coupled with each other in a loose state looser than the press fitting state.

11 Claims, 5 Drawing Sheets

FIG. 2

| INPUT | REDUCTION PLANET PINION CARRIER | REDUCTION PLANET PINION CARRIER | INPUT SHAFT | RAVIGNEAUX CARRIER | RAVIGNEAUX SUN GEAR 11 | RAVIGNEAUX CARRIER |
|---|---|---|---|---|---|---|
| OUTPUT | RAVIGNEAUX SUN GEAR 11 | RAVIGNEAUX SUN GEAR 12 | RAVIGNEAUX CARRIER | CASE | CASE | CASE |
|  | LOW/C (low clutch) | 3-5-R/C (3-5-reverse clutch) | H/C (high clutch) | L&R/B (low and reverse clutch) | 2-6/B (2-6 brake) | LOW O.W.C (low one-way clutch) |
| P |  |  |  |  |  |  |
| REV |  | E |  | E |  |  |
| N |  |  |  |  |  |  |
| 1ST | E |  |  | (E) |  | E |
| 2ND | E |  |  |  | E |  |
| 3RD | E | E |  |  |  |  |
| 4TH | E |  | E |  |  |  |
| 5TH |  | E | E |  |  |  |
| 6TH |  |  | E |  | E |  |

CONSTRUCTION OF COUPLING SPLINE SECTIONS OF AUTOMATIC TRANSMISSION

BACKGROUND OF THE INVENTION

1. Field of the Invention

The present invention relates to a construction of coupling spline sections of an automatic transmission.

2. Description of the Related Art

An automatic transmission constituting three axles has a mission case including an input shaft, a counter shaft, a drive shaft which are arranged in parallel. On the above shafts, there are arranged various elements such as a transmission unit, a gear and the like.

As is seen in FIG. 5, there is provided a counter driven gear 302 which is coaxially coupled with a counter shaft 300, wherein the counter shaft 300 is disposed between an input shaft and a dive shaft while the counter driven gear 302 meshes with a counter drive gear 301 disposed on the input shaft's side.

The counter shaft 300 has a first end side (left in FIG. 5) which is formed with a small-diameter shaft section 304, and a second end side (right in FIG. 5) which is formed with a reduction gear 306 united with the small-diameter shaft section 304.

The small-diameter shaft section 304 has an outer periphery which is formed with a spline section 308. There is formed a tubular section 310 which is united with the counter driven gear 302. The tubular section 310 has an inner periphery which is formed with a spline section 312. The spline section 312 of the tubular section 310 can be coupled with the spline section 308 of the small-diameter shaft section 304. Moreover, a nut 314 is screwed down on a first end (left in FIG. 5) of the small-diameter shaft section 304, in such a manner as to press the tubular section 310 on the reduction gear 306's side. This can constrain an axial movement of the counter driven gear 302.

There is provided a radial bearing 318 between an outer periphery of the tubular section 310, and the mission case 316. The counter shaft 300 can be rotatably born by means of the radial bearing 318.

The spline section 308 of the small-diameter shaft section 304 can be coupled, in an entire axial range thereof, with the spline section 312 of the tubular section 310 in a press fitting state.

Thus, too great a press fitting force may expand the tubular section 310, thereby applying a stress to the radial bearing 318 from inside. Too great a stress may reduce accuracy of the radial bearing 318 in rotatably bearing the counter shaft 300, to thereby deteriorate durability.

For preventing possible failures such as split, crack and the like (which may be caused by the stress applied to the inner periphery of the tubular section 310), the tubular section 310 is to be designed thick. This may involve a large size of the whole unit.

BRIEF SUMMARY OF THE INVENTION

It is an object of the present invention to provide a construction of coupling spline sections of an automatic transmission, wherein the construction includes a rotary shaft section and a rotary hollow section which are coupled with each other via spline sections thereof.

It is another object of the present invention to prevent a harmful effect attributable to an expansion caused by press fitting the rotary shaft section into the rotary hollow section.

According to an aspect of the present invention, there is provided a construction of coupling spline sections of an automatic transmission. The construction comprises: a rotary shaft section having an outer periphery formed with a spline section; a rotary hollow section having an inner periphery formed with a spline section which is coupled with the spline section of the rotary shaft section in a press fitting state; a support member; and a bearing disposed between a part of an outer periphery of the rotary hollow section and the support member. The bearing rotatably bears the rotary shaft section in such a manner as to transmit a torque between the rotary shaft section and the rotary hollow section. The spline section of the rotary shaft section and the spline section of the rotary hollow section which are disposed at least inside the bearing are coupled with each other in a loose state looser than the press fitting state.

The other objects and features of the present invention will become understood from the following description with reference to the accompanying drawings.

BRIEF DESCRIPTION OF THE SEVERAL VIEWS OF THE DRAWINGS

FIG. 2 is a table showing operations of the automatic transmission.

DETAILED DESCRIPTION OF THE EMBODIMENTS

In the following, various embodiments of the present invention will be described in detail with reference to the accompanying drawings.

For ease of understanding, the following description will contain various directional terms, such as, left, right, upper, lower and the like. However, such terms are to be understood with respect to only a drawing or drawings on which the corresponding part of element is illustrated.

Figure 1:
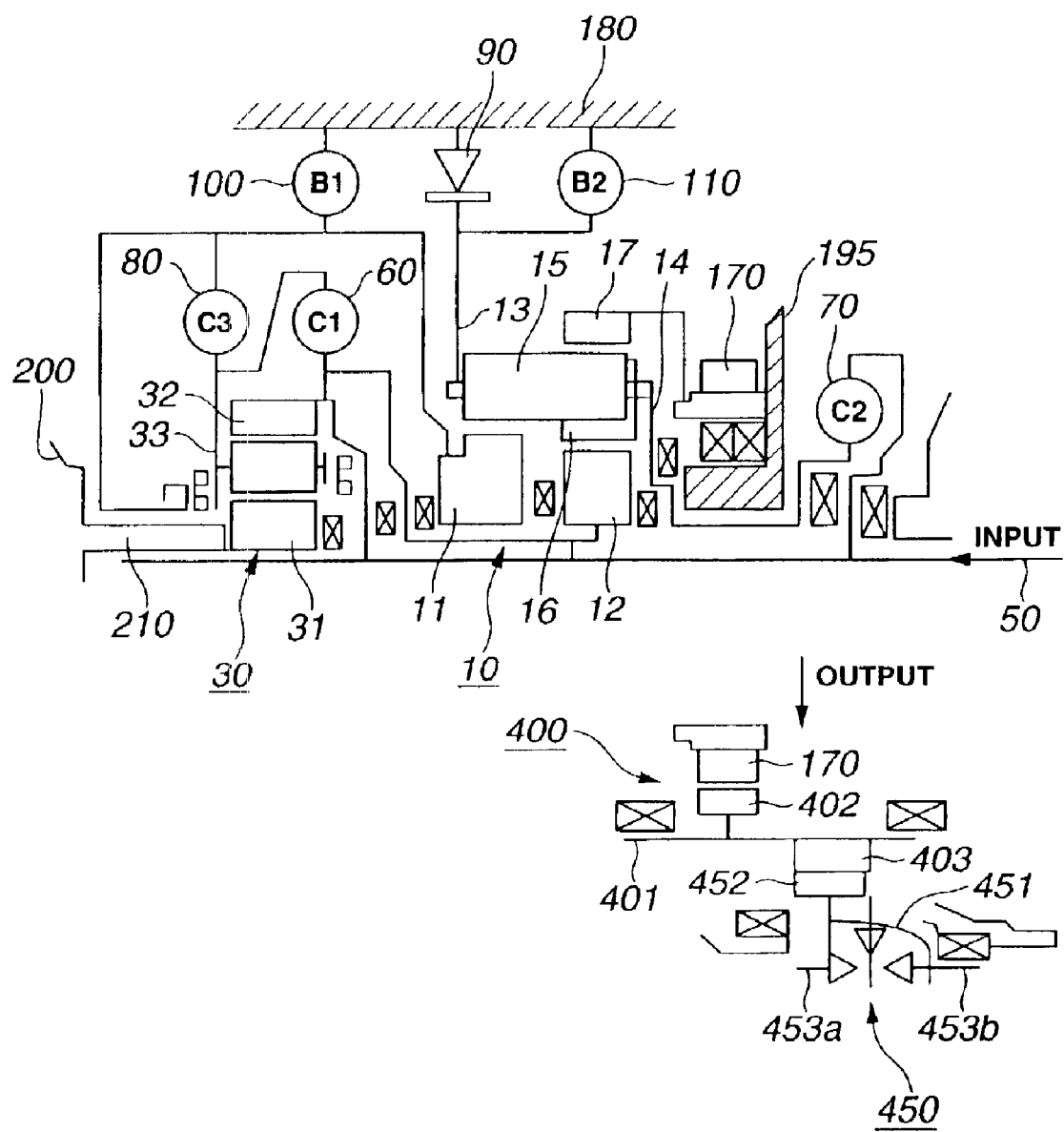
FIG. 1 is a skeleton diagram of a construction of an automatic transmission, according to an embodiment of the present invention.

As is seen in FIG. 1, there is provided a gear train (skeleton diagram) of an automatic transmission, according to an embodiment of the present invention.

The automatic transmission shown in FIG. 1 is what is called a 3-axle transmission, namely, a transaxle which is disposed laterally in an FF (front engine and front drive) vehicle and/or an RR (rear engine and rear drive) vehicle. Moreover, the transmission gear is provided with a gear train achieving six forward speeds and one reverse speed.

The automatic transmission has a mission case 180 which is constituted of an input shaft 50 (primary shaft), a counter shaft 401, a differential shaft 453a, a differential shaft 453b and the like arranged in parallel with each other. Moreover, various elements such as a transmission unit, a gear and the like are disposed on each of the above shafts.

A torque is inputted into the input shaft 50 from an engine (not shown in FIG. 1, but assumes right in FIG. 1) by way of a torque converter. The input shaft 50 has an output side which is disposed on the torque converter's side. The counter shaft 401 is disposed in parallel with the input shaft

50. The counter shaft 401 has a counter gear 400 which meshes with an output gear of the input shaft 50. A differential carrier 451 carrying the differential shaft 453*a* and the differential shaft 453*b* is provided with a final gear 452 to which the torque is transmitted by way of the counter gear 400 of the counter shaft 401. More specifically hereinabove, the differential shaft 453*a* is a left shaft which makes a deferential revolution due to a differential gear, while the differential shaft 453*b* is a right shaft which makes the differential revolution due to the differential gear.

The automatic transmission is provided with the transmission unit around the input shaft 50. The transmission unit is constituted of a first planetary gear set 10, a second planetary gear set 30, a first clutch 60, a third clutch 80, a second clutch 70, a first brake 100, a second brake 110, and a one-way clutch 90. The first planetary gear set 10 can output a plurality of transmission speeds from an input speed, namely, a reduction speed and a non-reduction speed of the input shaft 50. The second planetary gear set 30 can output the reduced speed of the input shaft 50. The second planetary gear set 30 and the first planetary gear set 10 have, respectively, a large-diameter sun gear 11 and a small-diameter sun gear 12 having diameters different from each other. The first clutch 60 and the third clutch 80 are engageably and disengageably interposed between the large-diameter sun gear 11 and the small-diameter sun gear 12. The second clutch 70 is engageably and disengageably interposed between the input shaft 50 and a second carrier 14 of the first planetary gear set 10. The first brake 100 can brake the large-diameter sun gear 11 of the first planetary gear set 10, while the second brake 110 can brake the first carrier 13 of the first planetary gear set 10. The one-way clutch 90 is interposed in parallel with the second brake 110.

Each of the first clutch 60, the second clutch 70, the first clutch 80, the first brake 100, and the second brake 110 is a frictional member, and in a form of a multiple-disk. The first clutch 60 is disposed in the vicinity of an outer periphery of the second planetary gear set 30. The third clutch 80 is disposed backward the first clutch 60. The second clutch 70 is disposed at a front end of the mission case 180. The first brake 100 is disposed between the first clutch 60 and an inner periphery of the mission case 180. The second brake 110 is disposed between the first planetary gear set 10 and the inner periphery of the mission case 180. The one-way clutch 90 is disposed between the first brake 100 and the second brake 110.

The first planetary gear set 10 is constituted of the following four transmission elements: 1) the large-diameter sun gear 11, 2) the small-diameter sun gear 12, 3) the first carrier 13 and the second carrier 14, and 4) the ring gear 17. A long pinion 15 can mesh with the large-diameter sun gear 11, and a short pinion 16 can mesh with the small-diameter sun gear 12. Moreover, the long pinion 15 can mesh with inner teeth of the ring gear 17, constituting a ravigneaux gear.

The large-diameter sun gear 11 and the small-diameter sun gear 12 constitute the input element for reduced speed, where the input from the input shaft 50 is transmitted by way of the second planetary gear set 30. In other words, the small-diameter sun gear 12 connects to the first clutch 60, thus receiving the input from the second planetary gear set 30.

The large-diameter sun gear 11 connects to the third clutch 80, thus receiving the input from the second planetary gear set 30. Moreover, the large-diameter sun gear 11 can be fixed to the mission case 180 by means of the first brake 100.

The first carrier 13 and the second carrier 14 can carry the long pinion 15 and the short pinion 16 meshing with each other. The first carrier 13 and the second carrier 14 constitute the input element of a non-reduction speed, wherein the input speed is directly transmitted from the input shaft 50. The second carrier 14 connects to the input shaft 50 by way of the second clutch 70. The first carrier 13 can be fixed to the mission case 180 by means of the second brake 110. The one-way clutch 90 allows one-way speed only relative to the mission case 180. Herein, the one-way clutch 90 defines an engagement direction which direction is the same as that of the reverse torque at the first speed, thereby effecting the second brake 110. Moreover, the ring gear 17 constitutes an output element, and connects to a counter drive gear 170. The counter drive gear 170 is disposed between the first planetary gear set 10 and the second clutch 70. As described hereinafter, the counter drive gear 170 is rotatably supported to a middle bulkhead 195 which is separated from the input shaft 50.

The second planetary gear set 30 is constituted of the following three transmission elements: a sun gear 31, a ring gear 32, and a carrier 33. In the second planetary gear set 30, the sun gear 31 is fixed to a sleeve member 210 which is formed on a side cover 200 of the mission case 180, to be described afterward. As the input element, the ring gear 32 connects to the input shaft 50. Moreover, as the output element, the carrier 33 connects to the first planetary gear set 10 by way of the first clutch 60 and the second clutch 80.

The counter gear 400 is constituted of a counter driven gear 402 and a reduction gear 403. The counter driven gear 402 having a large diameter can mesh with the counter drive gear 170 fixed on the back end side of the counter shaft 401 which is in parallel with the input shaft 50 and shorter than the input shaft 50. The reduction gear 403 having a small diameter is the output element. On the counter shaft 401, the reduction gear 403 is fixed on the front end side relative to the counter driven gear 402. By means of the counter driven gear 402 and the reduction gear 403, the counter gear 400 can reduce and reverse the output speed from the input shaft 50, and send the output speed (reduced and reversed) to a differential device 450, thereby effecting a proper reduction ratio.

The differential device 450 allows a differential gear 452 fixed in a deferential case (not shown) to mesh with the reduction gear 403 of the counter gear 400. With this, a differential speed of the differential gear disposed in the differential case (not shown) can be outputted to the differential shaft 453*a* and the differential shaft 453*b*.

The automatic transmission having the construction described above can effect transmission by means of an electronic controller (not shown) and a hydraulic controller (not shown), based on vehicular load and in a transmission range selected by a driver. The above transmission include six forward speeds (1ST to 6TH) and one reverse speed (REV).

FIG. 2 shows tabulated transmission steps effected by engagement and disengagement of each of the clutches and the brakes, wherein "E" denotes engagement while "blank" denotes disengagement.

Hereinafter described are operations of the six forward speeds (1ST to 6TH) and one reverse speed (REV):

The first speed (1ST) may be effected by engagement of the first clutch 60 and engagement of the second brake 110. Effecting the first speed (1ST) may take the following operations:

The speed transmitted from the input shaft 50 and reduced by way of the second planetary gear set 30 is inputted to the small-diameter sun gear 12 by way of the first clutch 60. The second carrier 14 which is engaged with the mission case 180 by engaging the one-way clutch 90 can be rendered as a reactive member. The reduced speed (maximum reduction ratio) of the ring gear 17 is outputted to the counter drive gear 170.

Hereinabove, a reactive torque applied to the first carrier 13 is reversed during engine coast (engine brake). Thus, in this case, the second brake 110 is to be engaged, as is denoted by (E) in FIG. 2.

The second speed (2ND) may be effected by engagement of the first clutch 60 and engagement of the first brake 100. Effecting the second speed (2ND) may take the following operations:

The speed transmitted from the input shaft 50 and reduced by way of the second planetary gear set 30 is inputted to the small-diameter sun gear 12 by way of the first clutch 60. The large-diameter sun gear 11 which is fixed to the mission case 180 by engaging the first brake 100 can be rendered as a reactive member. The reduced speed {reduction ratio: smaller than that of the first speed (1ST)} of the ring gear 17 is outputted to the counter drive gear 170.

The third speed (3RD) may be effected by synchronous engagements, namely engagement of the first clutch 60 and engagement of the third clutch 80. Effecting the third speed (3RD) may take the following operations:

The speed transmitted from the input shaft 50 and reduced by way of the second planetary gear set 30 is inputted synchronously to the large-diameter sun gear 11 and the small-diameter sun gear 12 by way of, respectively, the third clutch 80 and the first clutch 60. With this, the first planetary gear set 10 can be in a state of direct drive. The reduced speed of the ring gear 17 is outputted to the counter drive gear 170. Hereinabove, the reduced speed of the ring gear 17 is the same as input speeds to the large-diameter sun gear 11 and the small-diameter sun gear 12, and is lower than the speed of the input shaft 50.

The fourth speed (4TH) may be effected by synchronous engagements, namely engagement of the first clutch 60 and engagement of the second clutch 70. Effecting the fourth speed (4TH) may take the following operations:

The speed transmitted from the input shaft 50 and reduced by way of the second planetary gear set 30 is inputted the small-diameter sun gear 12 by way of the first clutch 60. On the other hand, the non-reduction speed transmitted from the input shaft 50 by way of the second clutch 70 can be inputted to the second carrier 14. A middle speed in the midst of the above two inputted speeds can be outputted to the counter drive gear 170 as the speed of the ring gear 17. Hereinabove, the middle speed is slightly lower than the speed of the input shaft 50.

The fifth speed (5TH) may be effected by synchronous engagements, namely engagement of the second clutch 70 and engagement of the third clutch 80. Effecting the fifth speed (5TH) may take the following operations:

The speed transmitted from the input shaft 50 and reduced by way of the second planetary gear set 30 is inputted the large-diameter sun gear 11 by way of the third clutch 80. On the other hand, the non-reduction speed transmitted from the input shaft 50 by way of the second clutch 70 can be inputted to the second carrier 14. A speed slightly higher than the speed of the input shaft 50 can be outputted to the counter drive gear 170.

The sixth speed (6TH) may be effected by engagement of the second clutch 70 and engagement of the first brake 100. Effecting the sixth speed (6TH) may take the following operations:

The non-reduction speed transmitted from the input shaft 50 can be inputted only to the second carrier 14 by way of the second clutch 70. The large-diameter sun gear 11 which is fixed to the mission case 180 by engaging the first brake 100 can be rendered as a reactive member. The further increased speed of the ring gear 17 is outputted to the counter drive gear 170.

The reversed speed (REV) may be effected by engagement of the third clutch 80 and engagement of the second brake 110. Effecting the reversed speed (REV) may take the following operations:

The speed transmitted from the input shaft 50 and reduced by way of the second planetary gear set 30 is inputted to the large-diameter sun gear 11 by way of the third clutch 80. The second carrier 14 which is fixed to the mission case 180 by engaging the second brake 110 can be rendered as a reactive member. The reversed speed of the ring gear 17 is outputted to the counter drive gear 170.

Figure 3:
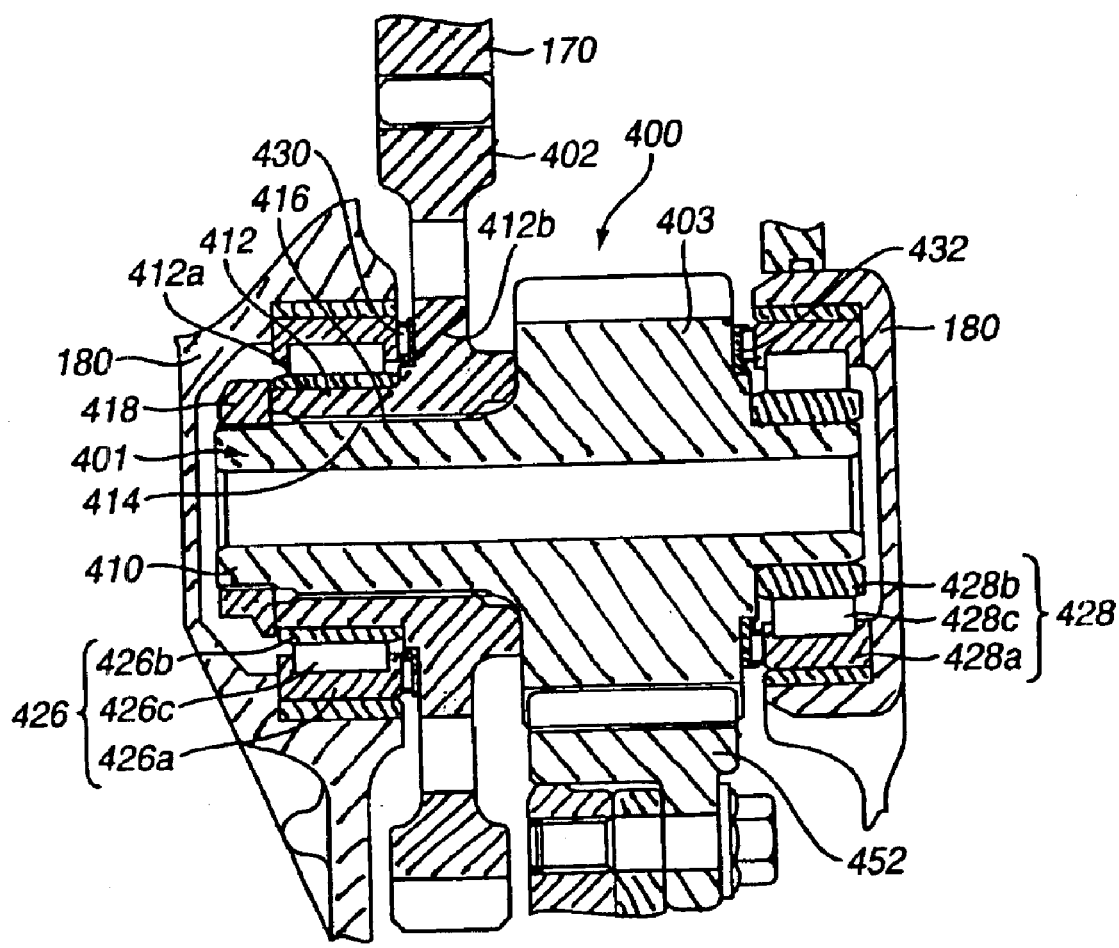
FIG. 3 shows a construction around a counter gear 400, according to the embodiment of the present invention.

FIG. 3 shows a detailed construction of the counter gear 400 described above.

The counter gear 400 is constituted of the counter driven gear 402 and the reduction gear 403. The counter driven gear 402 connects to the small-diameter shaft section 410 which is disposed on the first end side (left in FIG. 3) of the counter shaft 401, while the reduction gear 403 is unitedly formed on the second end side (right in FIG. 3) of the counter shaft 401.

The counter driven gear 402 is equipped with a tubular section 412 having an inner periphery which is formed with a spline section 414. Moreover, the small-diameter shaft section 410 has an outer periphery which is formed with a spline section 416. Fitting the tubular section 412 over the small-diameter shaft section 410 can allow the spline section 414 and the spline section 416 to mate with each other, causing a spline coupling. The tubular section 412 is formed with substantially a tubular or cylindrical portion 412a and an extended portion 412b which extends substantially orthogonally relative to the cylindrical portion 412a.

Moreover, screwing a nut 418 down on a thread at a first end (left in FIG. 3) of the small-diameter shaft section 410 of the counter shaft 401 to such an extent that a side face (right in FIG. 3) of the tubular section 412 opposite to the nut 418's side of the tubular section 412 abuts on the reduction gear 403 can restrict an axial movement of the counter driven gear 402 on the counter shaft 401. The counter shaft 401 can be rotatably born by a first radial bearing 426 and a second radial bearing 428. Herein, the first radial bearing 426 is disposed between an inner wall of the mission case 180 and an outer periphery of the tubular section 412, while the second radial bearing 428 is disposed between the inner wall of the mission case 180 and an outer periphery {on the second end side (right in FIG. 3)} of the counter shaft 401.

The first radial bearing 426 is constituted of an outer race 426a abutting on the inner wall of the mission case 180, an inner race 426b abutting on the outer periphery of the tubular section 412, and a tube 426c rollably disposed between the outer race 426a and the inner race 426b, On the other hand, the second radial bearing 428 is constituted of an outer race 428a abutting on the inner wall of the mission case 180, an inner race 428b abutting on the outer periphery {on the second end side (right in FIG. 3)} of the counter shaft 401, and a tube 428c rollably disposed between the outer race 428a and the inner race 428b. Moreover, there is provided a first thrust bearing 430 between the outer race 426a (of the first radial bearing 426) and a side face (left in FIG. 3) of the counter driven gear 402, while there is provided a second thrust bearing 432 between the outer race 428a (of the second radial bearing 428) and a side face (right in FIG. 3) of the reduction gear 403.

Figure 4:
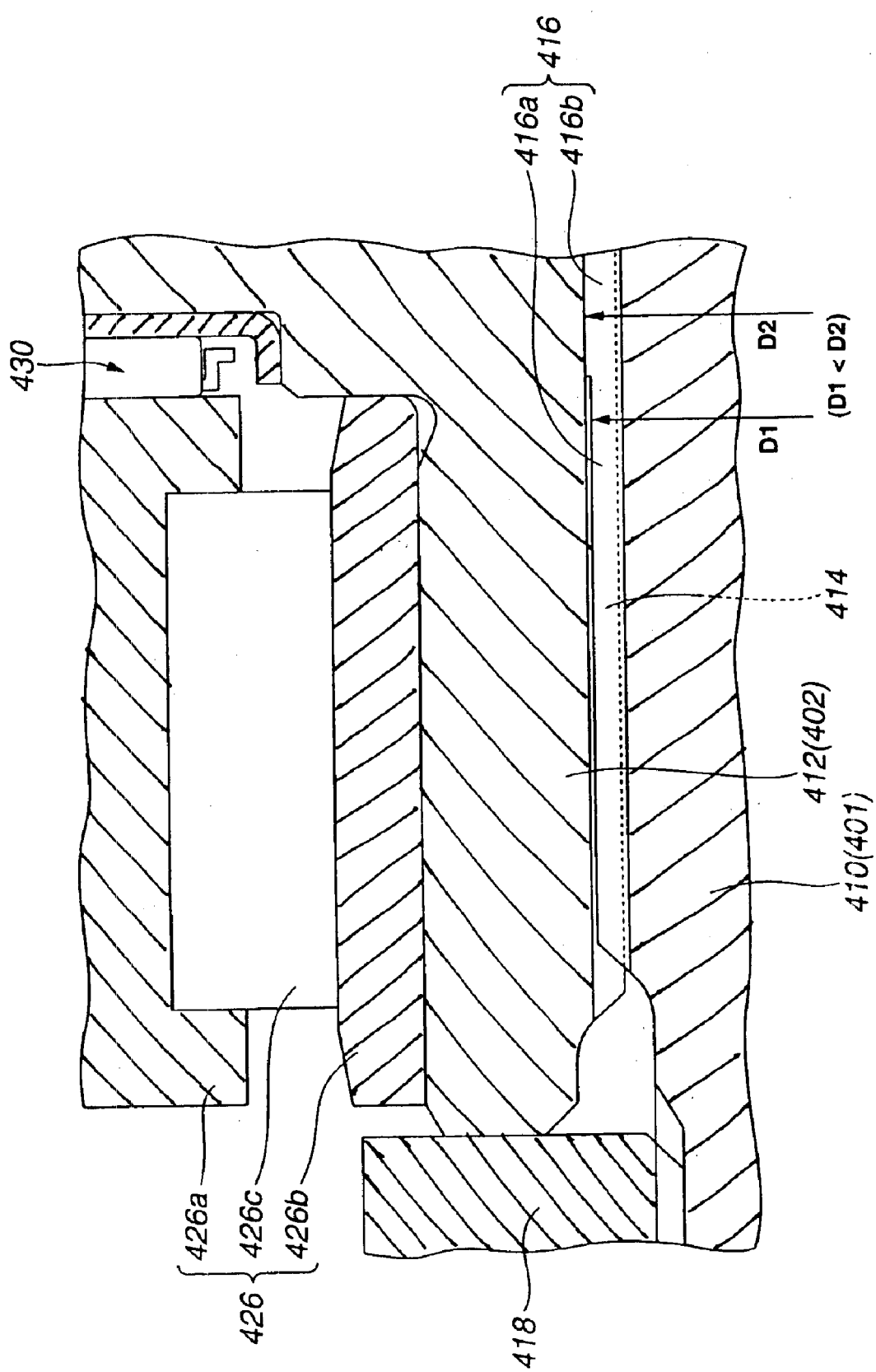
FIG. 4 is an enlarged view of essential portions, according to the embodiment of the present invention.
Figure 5:
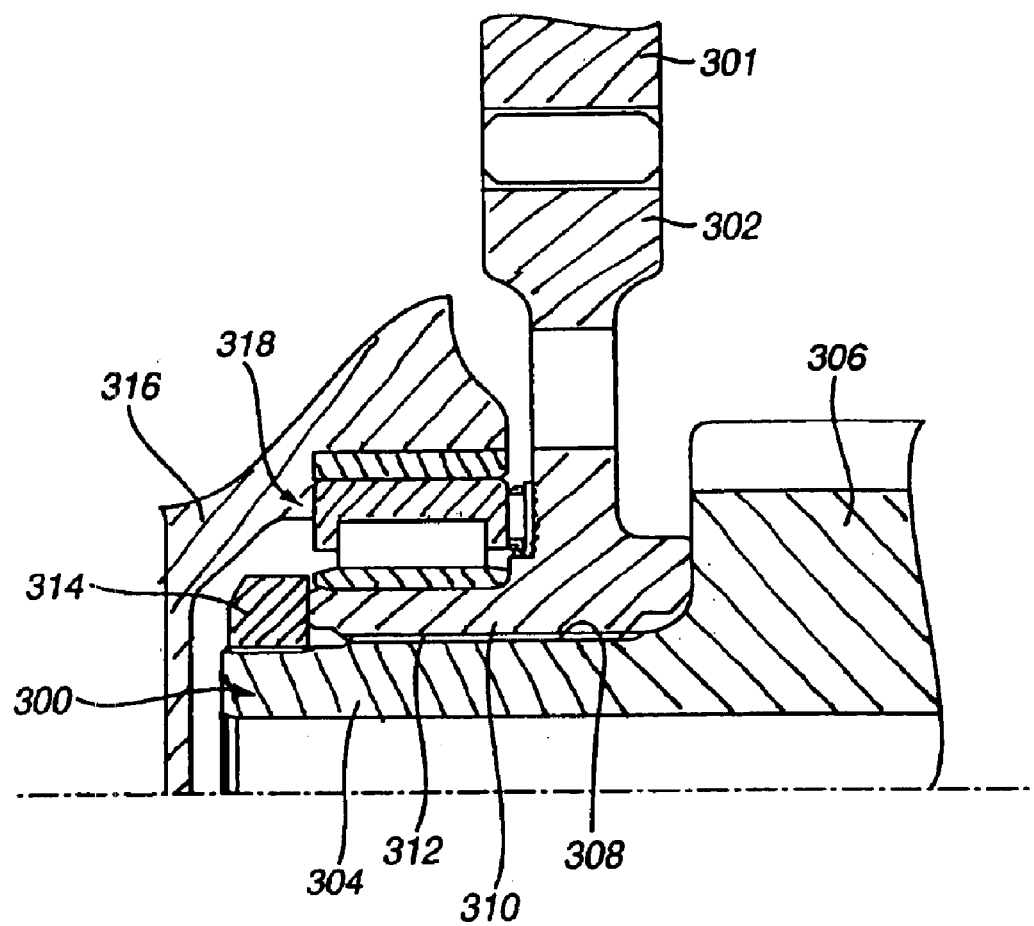
FIG. 5 shows a construction around a counter gear, according to a related art.

Hereinabove, the spline section 416 disposed on the outer periphery of the small-diameter shaft section 410 has concave rows and convex rows which are alternately arranged circumferentially. As is seen in FIG. 4, a convex row 416a on the first end side (left in FIG. 4) defines a first external diameter dimension D1, wherein the convex row 416a is disposed inside the first radial bearing 426. Contrary to this, a convex row 416b on the second end side (right in FIG. 4) defines a second external diameter dimension D2. The first external diameter dimension D1 is set smaller than the second external diameter dimension D2 (D1<D2). With D1<D2, the spline section 416 on the first end side (left in FIG. 4) formed with the convex row 416a (defining the first external diameter dimension D1 [small]) can be coupled with the spline section 414 of the tubular section 412 in such a manner as to cause a loose spline-coupling state, while the spline section 416 on the second end side (right in FIG. 4) formed with the convex row 416b (defining the second external diameter dimension D2 [large]) can be coupled with the spline section 414 of the tubular section 412 in such a manner as to cause a press fitting state.

With the construction described above {namely, the spline section 416 (defining the convex row 416a) on the first end side (left in FIG. 4) of the small-diameter shaft section 410 disposed inside the first radial bearing 426 is coupled with the spline section 414 of the tubular section 412 of the counter driven gear 402 in such a manner as to cause the "loose" spline-coupling}, the first radial bearing 426 disposed on the outer periphery of the small-diameter shaft section 410 can be free from any stress which may direct from radially inside to radially outward. With the above free-stress state, the counter shaft 401 can be rotatably born in an ordinary state.

Even if the tubular section 412 has a thin wall, the inner periphery of the tubular section 412 can be free from any crack, split and the like, since no stress attributable to expansion of the small-diameter shaft section 410 is applied to the inner periphery on the first end side (left in FIG. 4) of the tubular section 412.

With the first external diameter dimension D1 of the convex row 416a on the first end side (left in FIG. 4) of the small-diameter shaft section 410 set smaller than the second external diameter dimension D2 of the convex row 416b on the second side (right in FIG. 4), the convex row 416a on the first end side can act as guide for causing the spline coupling of the spline section 414 (of the tubular section 412) with the spline section 416 (of the counter shaft 401). Thus, the counter driven gear 402 can be mounted to the small-diameter shaft section 410 with ease.

Although the present invention has been described above by reference to a certain embodiment, the present invention is not limited to the embodiment described above. Modifications and variations of the embodiment described above will occur to those skilled in the art, in light of the above teachings.

More specifically, according to the embodiment described above, the area covered by the second external diameter dimension D2 of the convex row 416b of the spline section 416 is press fitted to the spline section 414. The present invention is, however, not limited to this. The following construction of the convex row 416a and the convex row 416b is allowed:

The external diameter dimension of the convex row 416b is the same as the external diameter dimension of the convex row 416a. More specifically, both the convex row 416b and the convex row 416a define the first external diameter dimension D1 (small), thereby the spline section 416 can leave a radial clearance relative to the spline section 414. Likewise, a convex row (not numbered in FIG. 4) of the spline section 414 defines the first external diameter dimension D1 (small), thereby the spline section 414 can leave a radial clearance relative to the spline section 416. In addition, a circumferential thickness of a tooth of the convex row 416b is set greater than a circumferential thickness of a tooth of the convex row 416a, thereby forming a circumferential clearance in a range covered by the tooth of the convex row 416a. With the construction described above, the tooth of the convex row 416b can be press fitted to between the two convex rows (not numbered in FIG. 4) of the adjacent two spline sections 414 (press fitting state); while the tooth (both addendum and dedendum thereof) of the convex row 416a can be disposed between the two convex rows (not numbered in FIG. 4) of the two adjacent spline sections 414, forming the respective circumferential clearances (loose state).

Moreover, according to the embodiment described above, the external diameter dimensions are differentiated between the following two convex rows, namely, the convex row 416a (disposed inside the first radial bearing 426) of the spline section 416 disposed on the outer periphery of the small-diameter shaft section 410, and the convex row 416b on the second end side (right in FIG. 4). The present invention is, however, not limited to this. A reversed construction is allowed, in other words, the spline section 414 of the tubular section 412 can be replaced with the spline section 416 of the small-diameter shaft section 410. More specifically described as follows:

The spline section 414 disposed on the inner periphery of the tubular section 412 of the counter driven gear 402 can be so formed that the convex row (not numbered in FIG. 4) disposed inside the first radial bearing 426 is set greater in internal diameter dimension than the convex row (not numbered in FIG. 4) disposed on the second end side (right in FIG. 4). In this case, the same operation and effect (press fitting state and loose state) can be obtained.

Moreover, according to the embodiment described above, the automatic transmission has the gear train effecting six forward speeds. The present invention is, however, not limited this. More specifically, gear trains of the automatic transmission effecting five or less forward speeds, or seven or more forward speeds can be allowed.

The entire contents of basic Japanese Patent Application No. P2001-303914 (filed on Sep. 28, 2001 in Japan) of which priority is claimed is incorporated herein by reference, in order to take some protection against mistranslation or omitted portions.

The scope of the present invention is defined with reference to the following claims.

What is claimed is:

1. A construction of coupling spline sections of an automatic transmission, comprising:
   a rotary shaft section having an outer periphery formed with a spline section;
   a rotary hollow section having an inner periphery formed with a spline section which is coupled with the spline section of the rotary shaft section so that a portion of the coupling is in a press fitting state;
   a support member; and
   a bearing disposed between a part of an outer periphery of the rotary hollow section and the support member, the bearing rotatably bearing the rotary shaft section in such a manner as to transmit a torque between the rotary shaft section and the rotary hollow section, wherein the spline section of the rotary shaft section and the spline section of the rotary hollow section which are disposed at least inside the bearing are coupled with each other in a loose state looser than the press fitting state, wherein the spline section of the rotary shaft section and the spline section of the rotary hollow section are coupled with each other in the loose state on a first end side of the rotary hollow section so that a stress applied to the first end side of the rotary hollow section due to expansion of the rotary shaft section is less than a stress applied in the press fitting state, and wherein the spline section of the rotary shaft section and the spline section of the rotary hollow section are coupled with each other in the press fitting state on a side other than the first end side of the rotary hollow section.

2. The construction of coupling the spline sections of the automatic transmission, as claimed in claim 1, wherein
the bearing is disposed between the outer periphery on a first end side of the rotary hollow section and the support member.

3. The construction of coupling the spline sections of the automatic transmission, as claimed in claim 1, wherein
the rotary shaft section is a counter shaft,
the rotary hollow section is a tubular section of a counter driven gear,
a spline section formed on an outer periphery of the counter shaft and a spline section formed on an inner periphery of the tubular section are coupled with each other,
the bearing is disposed between an outer periphery on a first end side of the tubular section and the support member, the first end side of the tubular section substantially matching an end side of the counter shaft,
the spline section of the counter shaft and the spline section of the tubular section are coupled with each other in a loose state on the first end side of the tubular section, and
the spline section of the counter shaft and the spline section of the tubular section are coupled with each other in a press fitting state less looser than the loose state, on a side other than the first end side of the tubular section.

4. The construction of coupling the spline sections of the automatic transmission, as claimed in claim 1, wherein the support member is a mission case.

5. The construction of coupling the spline sections of the automatic transmission, as claimed in claim 3, wherein
the spline section formed on the outer periphery of a small-diameter shaft section of the counter shaft has a concave row and a convex row which are alternately arranged circumferentially,
the convex row on a first end side of the spline section of the counter shaft defines a first external diameter dimension, and is disposed inside the bearing,
the convex row on a second end side of the spline section of the counter shaft defines a second external diameter dimension,
the first external diameter dimension is set smaller than the second external diameter dimension, and
the spline section on the first end side thereof formed with the convex row defining the first external diameter dimension is coupled with the spline section of the tubular section in such a manner as to cause the loose state, while the spline section on the second end side thereof formed with the convex row defining the second external diameter dimension is coupled with the spline section of the tubular section in such a manner as to cause the press fitting state.

6. The construction of coupling the spline sections of the automatic transmission, as claimed in claim 5, wherein
both the convex row on the second end side of the spline section of the counter shaft and the convex row on the first end side of the spline section of the counter shaft define the first external diameter dimension smaller than the second external diameter dimension, thereby the spline section of the counter shaft leaves a radial clearance relative to the spline section of the tubular section,
a convex row of the spline section of the tubular section defines an external diameter dimension substantially equal to the first external diameter dimension, thereby the spline section of the tubular section leaves a radial clearance relative to the spline section of the counter shaft,
a circumferential thickness of a tooth of the convex row on the second end side of the spline section of the counter shaft is set greater than a circumferential thickness of a tooth of the convex row on the first end side of the spline section of the counter shaft, thereby forming a circumferential clearance in a range covered by the tooth of the convex row on the first end side of the spline section of the counter shaft, and
the tooth of the convex row on the second end side of the spline section of the counter shaft is interposed between the two convex rows of the two adjacent spline sections of the tubular section, to thereby form the press fitting state; while the tooth of the convex row on the first end side of the spline section of the counter shaft is disposed between the two convex rows of the two adjacent spline sections of the tubular section, to thereby form the loose state.

7. The construction of coupling the spline sections of the automatic transmission, as claimed in claim 3, wherein
the spline section formed on the inner periphery of the tubular section has a concave row and a convex row which are alternately arranged circumferentially,
the convex row on a first end side of the spline section of the tubular section defines a first internal diameter dimension, and is disposed inside the bearing,
the convex row on a second end side of the spline section of the tubular section defines a second internal diameter dimension,
the first internal diameter dimension is set greater than the second internal diameter dimension, and
the spline section on the first end side thereof formed with the convex row defining the first internal diameter dimension is coupled with the spline section of the counter shaft in such a manner as to cause the loose state, while the spline section on the second end side thereof formed with the convex row defining the second internal diameter dimension is coupled with the spline section of the counter shaft in such a manner as to cause the press fitting state.

8. The construction of coupling the spline sections of the automatic transmission, as claimed in claim 3, wherein
a nut is screwed down on a thread at a first end of a small-diameter shaft section of the counter shaft to such an extent that a side face of the tubular section opposite to the nut's side of the tubular section abuts on a reduction gear which is so disposed as to face the side face of the tubular section, to thereby restrict an axial movement of the counter driven gear on the counter shaft.

9. The construction of coupling the spline sections of the automatic transmission, as claimed in claim 1, wherein the rotary hollow section includes a cylindrical portion and an extended portion which extends substantially orthogonally relative to the cylindrical portion.

10. The construction of coupling the spline sections of the automatic transmission, as claimed in claim 9, wherein an end side of the other side of the rotary hollow section is press fitted in a position corresponding to the extended portion of the rotary hollow section.

11. A construction of coupling spline sections of an automatic transmission, comprising:

a rotary shaft section having an outer periphery formed with a spline section;

a rotary hollow section having an inner periphery formed with a spline section;

a support member; and a bearing disposed between a part of the outer periphery of the rotary hollow section and the support member, the bearing rotatably bearing the rotary shaft section in such a manner as to transmit a torque between the rotary shaft section and the rotary hollow section, wherein the spline section of the rotary shaft section includes a first spline portion coupled to the spline section of the rotary hollow section at an end of the rotary hollow section and a second spline portion coupled to the spline section of the rotary hollow section at the other end of the rotary hollow section, wherein the first spline portion of the rotary shaft section is coupled with the spline section of the rotary hollow section in a press fitting state, and wherein the second spline portion of the rotary shaft section is coupled with the spline section of the rotary hollow section in a loose state looser than the press fitting state.

\* \* \* \* \*